UNITED STATES PATENT OFFICE 2,265,488

α-DICARBONYL COMPOUNDS OF THE CYCLOPENTANO - POLYHYDROPHENANTHRENE SERIES AND PROCESS OF MAKING SAME

Karl Miescher, Riehen, and Albert Wettstein, Basel, Switzerland, assignors, by mesne assignments, to Ciba Pharmaceutical Products, Incorporated, Summit, N. J., a corporation of New Jersey No Drawing. Application June 25, 1938, Serial No. 215,868. In Switzerland July 13, 1937

6 Claims. (Cl. 260—397.3)

By this invention α-dicarbonyl compounds of the cyclopentano-polyhydrophenanthrene series can be made by treating a compound of the formula

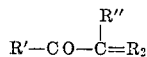

in which R' stands for a radical containing the cyclopentano-polyhydrophenanthrene ring structure, R'' stands for hydrogen or a monovalent radicle containing carbon, such as a substituted or unsubstituted alkyl, cycloalkyl, aralkyl or aryl group, an acyl group, a substituted carboxyl group such as an acid ester or amide group, or a cyano group and R₂ stands for two halogen atoms or for the diazo-group, with an agent suitable for replacing the halogen- or the diazo-group by oxygen.

As parent materials for the invention there come into consideration any compounds of the cyclopentano-polyhydrophenanthrene series containing an α-dihalogen ketone grouping or a diazo-ketone grouping in a side chain, in which the keto-group is nearer to the ring nucleus:

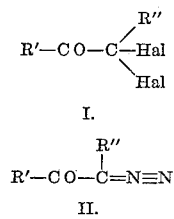

In the above formulae R' and R'' have the meaning above indicated. The ring carbon atoms containing the side chains may be also further substituted, for example by a free, esterified or etherified hydroxyl-group. The keto-groups of the side chains may moreover be attached directly to the cyclic nucleus, for example in 17- or 3-position or they may be separated from it for example by one or more carbon atoms. Diazoketones of this kind are obtainable for example by reaction of the corresponding acid halides with aliphatic diazo compounds. The α-dihalogen ketones can be obtained by the action of a halogen on the diazo-ketones. By compounds of the cyclopentano-polyhydrophenanthrene series are understood for example compounds of the type of aetio-cholane, pregnane, oestrone, hydrooestrone and their stereo-isomers. The parent materials may be saturated or they may contain one or more unsaturated linkages. Besides the aforesaid side chain groups they may naturally contain other substituents for example substituted or unsubstituted hydroxyl, carbinol, amino, carboxyl or hydrocarbon groups or halogen atoms or in particular cyclic keto-groups or enol derivatives thereof such as enol esters and enol ethers. In the latter case the enol grouping may be reconverted into the keto-group after the reaction. As parent materials there may be named more particularly for example saturated and unsaturated 3-oxy- or 3-keto-21-dihalogen-pregnanones-(20) such as 21-dihalogen-progesterone, 3-oxy- or 3-keto-21-dihalogen-pregnane-20-one-21 - carboxylic acid esters, 3 - dihalogenacetyl-aetio-allo-cholanols-(17) or -allo-cholanones-(17), 3-oxy- or 3-keto-21-diazo-pregnanoes-(20) such as 21-diazo-progesterone, 3-oxy- or 3-keto-21 - diazo - acetyl - pregnanones-(20) or stereoisomers or derivatives thereof, particularly enol derivatives.

The two halogen atoms in the α-dihalogen ketones may be replaced by oxygen by treatment with a hydrolyzing agent, for example water. Frequently there will also be used an acid or basic agent, for example oxalic acid or a carbonate or hydroxide of an alkali or an alkaline earth, for example a carbonate or hydroxide of calcium, magnesium, sodium or potassium, or an oxide of a heavy metal such as lead oxide. The diazo-group in the diazo-ketones may be replaced by oxygen on the one hand by direct oxidation, for example by the action of atmospheric oxygen advantageously with exposure to ultra-violet light, or of sulfur dioxide. On the other hand the diazo compounds may first be converted by reduction, for example by means of hydrogen sulfide or by catalytic reduction, for example with hydrogen activated by a metal such as colloidal palladium, into a hydrazone of the formula

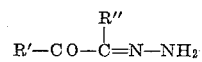

In the catalytic hydrogenation ketones are generally obtained as by-products owing to the replacement of the diazo-group by hydrogen. Finally the α-dicarbonyl compounds are liberated from the hydrazones by the action of a hydrolyzing agent, advantageously an acid.

Other substituents present may also undergo hydrolysis simultaneously with the halogen or the hydrazone group; this is the case for example with ester or ether groups such as enol ester or enol ether groups, or acyloxy-groups, cyanogroups or substituted carboxyl groups, in the case of which also a de-carboxylation may occur. If such cyano-groups or substituted carboxyl groups have not become saponified in the course of the process they may be saponified subsequently and the saponification may be followed by de-carboxylation. Keto-groups, α:β-unsaturated ketones and the like may for example undergo reduction simultaneously with the diazo-group.

The products may be isolated and purified for example by recrystallization or selective adsorption or by way of their derivatives, for example especially sparingly soluble condensation products with ketone reagents, or by a combination of these methods. They are compounds of therapeutic value or are capable of conversion into such compounds.

The following examples illustrate the invention, the parts being by weight:

Example 1

A solution of 1 part of 21-dibromo-progesterone (obtainable for example by the reaction of $\Delta^{4:5}$-3-keto-aetio-cholenic acid chloride with diazomethane and treatment of the product with bromine) in aqueous propyl alcohol is heated to boiling for several hours with calcium carbonate. The whole is then diluted with a large quantity of water, extracted with ether and the ethereal solution is washed with water, dried and evaporated. By recrystallizing the residue from dilute methanol there is obtained $\Delta^{4:5}$-3:20:21-trioxo-pregnene of the formula

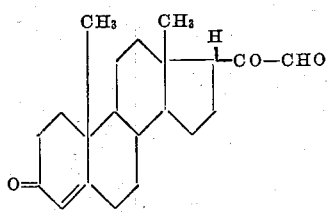

Trioxo-pregnene is likewise obtained if instead of 21-dibromo-progesterone a corresponding 21-dibromo-progesterone-21-carboxylic acid alkyl ester is subjected to the aforesaid reaction conditions with saponification of the ester group and de-carboxylation.

Instead of calcium carbonate an aqueous alcoholic solution of sodium carbonate may be used for the hydrolysis.

Example 2

Hydrogen sulfide is introduced for several days into a solution of 1 part of $\Delta^{5:6}$-21-diazo-pregnenol-(3)-one-(20) in 10 parts of alcohol, with occasional addition of a 2 n-solution of ammonia. The whole is then filtered, the filtrate is evaporated and the residue is extracted with ether. The fraction soluble in ether is heated with a solution of sulfuric acid and glacial acetic acid and the whole is then mixed with a large quantity of water and extracted with ether. The ethereal solution is washed with a solution of bicarbonate and with water and then evaporated. From the residue there is obtained by recrystallization, advantageously also by way of the very sparingly soluble disemicarbazone, $\Delta^{5:6}$-20:21.dioxo-pregnenol-(3) of the formula

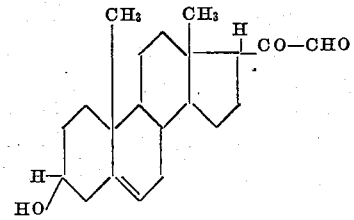

Instead of the free diazo-pregnenolone an ether or ester thereof may advantageously be used as parent material, for example the trityl ether. These compounds may be converted also by direct oxidation, for example with the aid of atmospheric oxygen, and subsequent saponification into $\Delta^{5:6}$-20:21-dioxo-pregnenol-(3).

By starting from $\Delta^{5:6}$-21-methyl-21-diazo-pregnenol-(3)-one-(20) the corresponding α-diketone is obtained. From $\Delta^{3:4}$-$\Delta^{5:6}$-3-acetoxy-11-oxy-21-diazo-pregnadiene-one-(20) there is obtained analogously with saponification of the enol-ester group $\Delta^{4:5}$-3:20:21-trioxo-pregnenol-(11). Saturated compounds can also be obtained in the same manner, for example those of the 3-epi-oxy-allo-pregnane series.

What we claim is:—

1. A process for the manufacture of α-dicarbonyl compounds of the cyclopentano-polyhydrophenanthrene series, comprising treating a compound of the formula

in which R' is a radical containing the cyclopentano-polyhydrophenanthrene ring structure, R'' is a member of the group consisting of hydrogen, a hydrocarbon radical, an acyl group and an alkyl-substituted carboxyl group, and R₂ is a member of the group consisting of two halogen atoms and the diazo-group, with an agent capable of replacing the group R₂ by oxygen.

2. A process as claimed in claim 1, wherein there is used as parent material a compound of the formula stated in claim 1, in which R'' stands for a member of the group consisting of an alkyl, cycloalkyl, aralkyl and aryl group.

3. A process as claimed in claim 1, wherein the carboxylic acid derivative formed is saponified and decarboxylated.

4. The α-dicarbonyl compounds of the cyclopentano-polyhydro-phenanthrene series of the formula

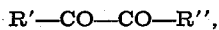

in which R' is a radical containing the cyclopentano-polyhydro-phenanthrene ring structure and R'' is a member of the group consisting of hydrogen, a hydrocarbon radical, an acyl group and an alkyl-substituted carboxyl group.

5. The saturated and unsaturated 20:21-dioxy-pregnanes.

6. The $\Delta^{4,5}$-3:20:21-trioxy pregnene.

KARL MIESCHER.
ALBERT WETTSTEIN.